(12) United States Patent
Brooks

(10) Patent No.: US 8,006,122 B2
(45) Date of Patent: Aug. 23, 2011

(54) METHODS, SYSTEMS, AND COMPUTER PRODUCTS FOR DETECTION OF AND POLICY DIRECTED RESOLUTION OF SIGNALING SYMPATHY SICKNESS IN A MULTISYSTEM CLUSTER

(75) Inventor: Mark A. Brooks, Gaylordsville, CT (US)

(73) Assignee: International Business Machines Corporation, Armonk, NY (US)

(*) Notice: Subject to any disclaimer, the term of this patent is extended or adjusted under 35 U.S.C. 154(b) by 1261 days.

(21) Appl. No.: 11/621,835

(22) Filed: Jan. 10, 2007

(65) Prior Publication Data

US 2008/0168300 A1  Jul. 10, 2008

(51) Int. Cl.
*G06F 11/00* (2006.01)
(52) U.S. Cl. .......................................... 714/4
(58) Field of Classification Search .............. 714/4, 717; 709/224, 227; 370/221
See application file for complete search history.

(56) References Cited

U.S. PATENT DOCUMENTS

| | | | | |
|---|---|---|---|---|
| 5,023,873 A * | 6/1991 | Stevenson et al. | ................. | 714/4 |
| 5,056,007 A * | 10/1991 | Collins et al. | ................. | 710/119 |
| 5,432,933 A * | 7/1995 | Janicek | ................. | 718/100 |
| 5,553,292 A * | 9/1996 | Daly et al. | ................. | 710/260 |
| 5,732,206 A * | 3/1998 | Mendel | ................. | 714/4 |
| 6,032,271 A * | 2/2000 | Goodrum et al. | ................. | 714/56 |
| 6,038,658 A | 3/2000 | Chow | | |
| 6,052,796 A * | 4/2000 | Croslin | ................. | 714/4 |
| 6,178,421 B1 * | 1/2001 | Dahlen et al. | ................. | 707/692 |
| 6,185,562 B1 * | 2/2001 | Dahlen et al. | ................. | 1/1 |
| 6,223,200 B1 * | 4/2001 | Barnes et al. | ................. | 718/100 |
| 6,484,206 B2 * | 11/2002 | Crump et al. | ................. | 709/227 |
| 6,571,270 B1 * | 5/2003 | Lai et al. | ................. | 718/101 |
| 6,618,359 B1 * | 9/2003 | Chen et al. | ................. | 370/242 |
| 6,708,291 B1 * | 3/2004 | Kidder | ................. | 714/39 |
| 6,715,097 B1 * | 3/2004 | Kidder et al. | ................. | 714/2 |
| 6,766,467 B1 | 7/2004 | Neal et al. | | |
| 7,397,383 B2 * | 7/2008 | Chan et al. | ................. | 340/635 |
| 7,430,684 B2 * | 9/2008 | Goodman et al. | ................. | 714/4 |
| 7,644,310 B2 * | 1/2010 | Kang et al. | ................. | 714/30 |
| 7,864,817 B2 * | 1/2011 | Surek et al. | ................. | 370/519 |
| 2001/0024289 A1 | 9/2001 | Scott | | |
| 2003/0128705 A1 | 7/2003 | Yi et al. | | |
| 2003/0217318 A1 | 11/2003 | Choi | | |
| 2005/0175012 A1 | 8/2005 | Gupta et al. | | |
| 2005/0198272 A1 * | 9/2005 | Bernard et al. | ................. | 709/224 |
| 2005/0220032 A1 | 10/2005 | Hu | | |
| 2006/0010351 A1 * | 1/2006 | Lee | ................. | 714/43 |
| 2006/0123395 A1 * | 6/2006 | Andrews et al. | ................. | 717/127 |
| 2006/0179356 A1 * | 8/2006 | Goodman et al. | ................. | 714/43 |
| 2009/0204854 A1 * | 8/2009 | D'Alo et al. | ................. | 714/47 |
| 2009/0216893 A1 * | 8/2009 | Errickson et al. | ................. | 709/230 |
| 2009/0216923 A1 * | 8/2009 | Errickson et al. | ................. | 710/100 |
| 2009/0216927 A1 * | 8/2009 | Errickson et al. | ................. | 710/112 |

* cited by examiner

*Primary Examiner* — Amine Riad
(74) *Attorney, Agent, or Firm* — Cantor Colburn LLP; William Kinnaman

(57) ABSTRACT

A system and method for detection of and a policy directed resolution of signaling sympathy sickness. Embodiments include a system having a communication among the members, each member having a cross-system coupling facility (XCF), and a method of managing sympathy sickness, the method including detecting a sympathy sickness condition affecting at least one of the members, documenting the sympathy sickness condition and implementing a policy rule to resolve the sympathy sickness condition.

23 Claims, 6 Drawing Sheets

METHODS, SYSTEMS, AND COMPUTER PRODUCTS FOR DETECTION OF AND POLICY DIRECTED RESOLUTION OF SIGNALING SYMPATHY SICKNESS IN A MULTISYSTEM CLUSTER

TRADEMARKS

IBM® and SYSPLEX® are registered trademark of International Business Machines Corporation, Armonk, N.Y., U.S.A. Other names used herein may be registered trademarks, trademarks or product names of International Business Machines Corporation or other companies.

BACKGROUND

The present disclosure relates generally to a multisystem cluster, and, in particular, to a system and method for detection of signaling sympathy sickness in a multisystem Sysplex®, and a system and method for policy directed resolution of such sympathy sickness.

In a multi-system Sysplex®, if a system is not processing work in a timely manner, it can cause "sympathy sickness" on other systems in the Sysplex®. Sympathy sickness can surface in a variety of ways, but the symptoms typically include hangs where work performed on the systems do not make progress, work queues become longer and longer, and processes can terminate due to timeouts. When these types of conditions occur, it can be difficult to correctly diagnose the root cause as being a problem on some other system. Indeed, some of the tools (such as operator display commands) used to investigate the symptoms may be rendered useless as they themselves are impacted by the sympathy sickness problem. Because the problem cannot be diagnosed easily, operators are susceptible to taking inappropriate actions. For example, they may take down the system that is suffering sympathy sickness as opposed to the system that is causing the sympathy sickness Some installations implementing Sysplex® can experience this type of sympathy sickness due to cross-system coupling facilities (XCF) signaling. Typically, a multisystem Sysplex® includes components to monitor and report members that are not processing signals in a timely manner. For example, the XCF component of z/OS includes code to monitor and report (via messages to the operator and to log files) when it finds that a member of an XCF group is not processing signals in a timely manner. A member in this state is called a "stalled member". In some cases, the fact that the member is stalled has no apparent impact to the Sysplex®. In some cases, the stall condition persists long enough to consume all available signaling resources so that no new signals can be received across the signaling paths, which in turn causes signals to back up on the sending system(s), which can then cause delayed signal delivery and outright rejection of new signaling requests. These signal delays and or signal rejects then, in turn, impact the exploiting applications and subsystems, causing sympathy sickness. But from the "member is stalled" messages, one cannot typically discern whether the condition is in fact causing sympathy sickness. In addition, even if there does appear to be sympathy sickness (hangs, etc) on some other system, it may not be possible to discern whether the stalled member is actually causing the sympathy sickness.

Since XCF issues messages to indicate that a member is stalled, it is possible to use automation to react to these messages. For example, one might try to discover the reason for the member being stalled and take an appropriate action to remedy the condition. However, one problem with relying on the interception of these messages is that the component of z/OS responsible for processing messages, itself relies on signals and so may be impacted by sympathy sickness (or could suffer from other local problems) that prevent it from processing messages. Thus, the system automation may never see the message to which it is to react. Another problem with relying on these messages is that it is not necessarily the case that the stalled member is causing a sympathy sickness impact. Thus, one might take action needlessly or erroneously. If there is no automation to take action, there is an exposure that the operator will fail to notice the messages (assuming they do get presented) or fail to understand them, and thereby fail to take action to remedy the stalled member. In addition, one can only guess as to whether any action taken against the stalled member can solve the problem because one likely cannot definitively associate the sympathy sickness with the stalled member.

BRIEF SUMMARY

Exemplary embodiments include a method of managing sympathy sickness in a multi-system configuration having a communication among a plurality of members, each member having an XCF, the method including detecting a sympathy sickness condition affecting at least one of the plurality of members, documenting the sympathy sickness condition and implementing a policy rule to resolve the sympathy sickness condition.

Additional embodiments include a system for detection and resolution of signaling sympathy sickness, the system including a plurality of members distributed over a multi-system configuration, an XCF disposed on each of the plurality of members, a policy-directed process residing on at least one of the plurality of members, the process having instructions to allow the XCF to automatically terminate members of the system that declared sympathy sickness.

Additional embodiments include a method for detecting and resolving signaling sympathy sickness in a multi-system configuration, the method including establishing a policy-directed resolution of the signaling sympathy sickness in the multi-system configuration, which allows an XCF distributed in the multi-system configuration to automatically terminate a stalled member of the multi-system configuration, the stalled member causing signaling sympathy sickness on other members of the multi-system configuration, generating control signals between the members of the multi-system configuration, the control signals including indications that there exists the signaling sympathy sickness in one or more members of the multi-system configuration and data relating to a state of the signaling sympathy sickness, collecting data related to the signaling sympathy sickness via the measurement gatherer (IXCMG) interfaces of the XCF and automatically terminating the stalled member via the XCF.

Further embodiments include a storage medium with machine-readable computer program code for detecting and resolving signaling sympathy sickness in a multi-system configuration utilizing XCF, the storage medium including instructions for causing the server to implement a method, including establishing a failure management policy on the multi-system configuration, the policy having a rule that allows the XCF to automatically terminate a stalled member of the multi-system configuration if it is determined that the stalled member is causing sympathy sickness, implementing an XCF path restart protocol to determine whether or not signaling sympathy sickness exists in the multi-system configuration and terminating the stalled member via the XCF if it has been determined that no other member is terminating the stalled member.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
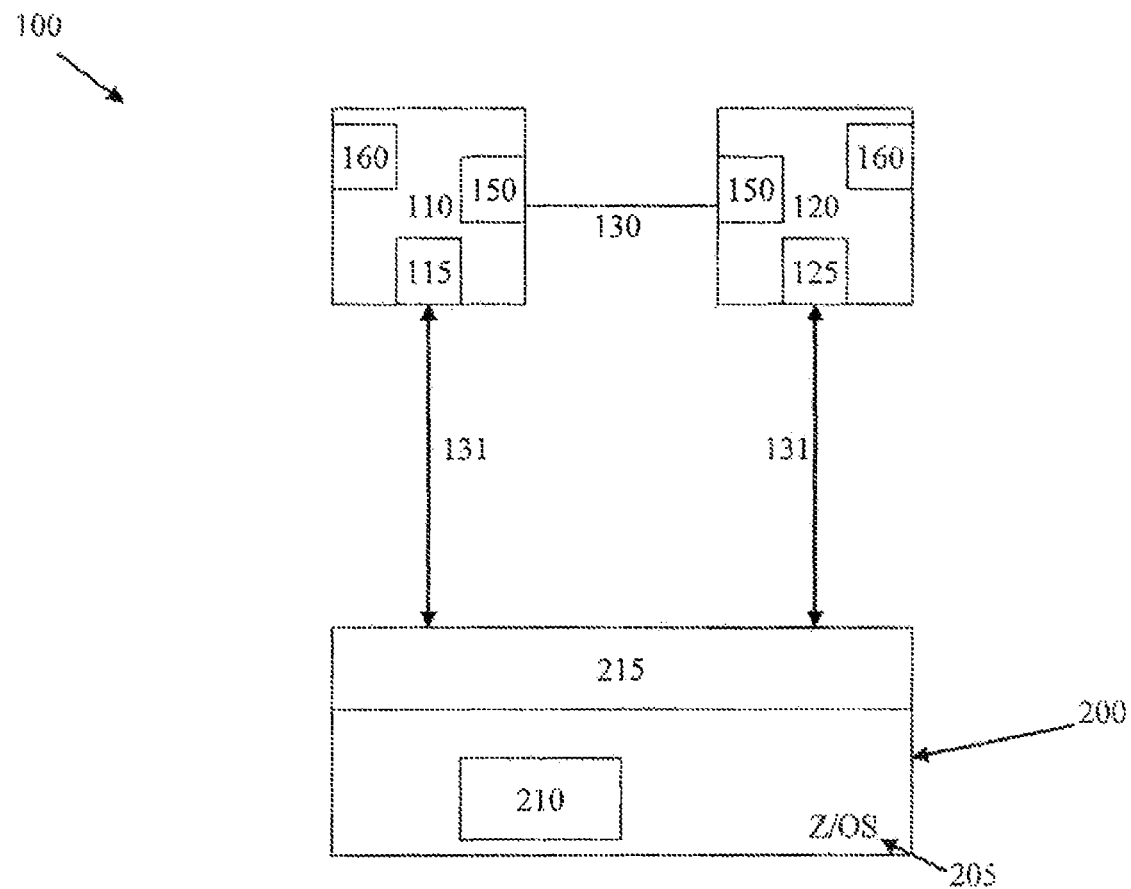
FIG. 1 illustrates one embodiment of a configuration, which includes two coupling facilities coupled to system in a parallel single system configuration.

The detailed description explains the preferred embodiments of the invention, together with advantages and features, by way of example with reference to the drawings.

DETAILED DESCRIPTION OF THE INVENTION

Exemplary embodiments include systems and methods for detection and policy directed resolution of signaling sympathy sickness in multi-system configurations such as the IBM® Sysplex®. The systems and methods monitor for sympathy sickness, determine whether or not sympathy sickness exists and takes action to eliminate the actual cause of the sympathy sickness. It is understood by those skilled in the art that the software subcomponent of the z/OS operating system that provides basic communication services is called XCF (cross-system coupling facility). It is further appreciated that a hardware component called the "coupling facility" contains structures (like list and cache). In general, "coupling facility" is used to refer to the hardware component and XCF is used to refer to the software component of z/OS. It is further understood by those skilled in the art that the cross-system extended services (XES) subcomponent of the z/OS operating system extends XCF to provide services to exploit the coupling facility, and that XCF and XES cooperate to manage coupling facilities and the structures they contain. Thus, these two subcomponents are sometimes referred to as XES/XCF, or XES, or XCF. In this disclosure, the term XCF is used to refer to any of the services provided by either subcomponent individually, or to any of the services that they provide cooperatively.

In exemplary embodiments, the existing XCF monitoring and detection of stalled members is extended to determine when a stalled member is causing sympathy sickness. In this context, "sympathy sickness" is defined to be the case where a member on a sending system is unable to transfer a signal to a target system because one or more stalled members on the target system are consuming the signaling resources needed to allow the target system to receive the signal. The system and method can explicitly determine when a stalled member is causing sympathy sickness, and can therefore explicitly determine that it is important for the stall condition to be resolved in a timely manner.

In a one implementation, a Sysplex® Failure Management (SFM) policy is enhanced to support a new keyword that allows the customer to control whether and when XCF is to take action to alleviate the sympathy sickness. If the SFM policy permits action, XCF terminates the stalled member. The sympathy sickness condition can be alleviated without operator intervention and without reliance on message automation that might itself be impacted by the sympathy sickness condition.

The terms "sympathy sickness" and "signaling sympathy sickness" each can have various specific meanings in the context of a multi-system configuration such as an IBM Sysplex® system implementing XCF signaling. For purposes of the disclosure, "signaling sympathy sickness" is defined to exist when a sending system is unable to send a signal to a target system because one or more stalled members on the target system are both (1) stalled, and (2) consuming signaling resources so that the target system is not able to receive any new signals from the sending system. Furthermore, an exemplary system described herein is the IBM® multi-system Parallel Sysplex®. However, it is understood that the embodiments of the systems and methods described herein can advantageous by be implemented in any suitable system that can suffer sympathy sickness.

In order to detect sympathy sickness, the two systems exchange signals. If the target system has stalled members that are consuming inbound signaling resources to the extent that new signals cannot be received, it needs to inform the sending system that this condition exists. However, it cannot necessarily be concluded that there is a sympathy sickness condition under these circumstances because there is no impact (under the aforementioned definition of signaling sympathy sickness) unless the sending system is unable to send a signal to the target system as a result. Thus, it is up to the sending system to determine whether it has such a signal and to declare that it is suffering from sympathy sickness caused by the stalled member(s) on the target system. In general, the methods and systems described herein terminate the stalled members that are causing the sympathy sickness. In another implementation, the methods and system also terminate stalled members suffering from sympathy sickness, if those members are also causing sympathy sickness.

FIG. 1 illustrates one embodiment of a configuration 100, which includes two coupling facilities 110, 120 coupled to system 200 in a Parallel Sysplex®. In one example, system 200 is running an instance of the z/OS operating system 205, offered by International Business Machines Corporation, Armonk, N.Y. System 200 can be running one or more applications 210 that are coupled to respective coupling facility structures 115, 125 (either of a cache or list type). The actual physical connections are managed by appropriate components, such as XCF 215 of the z/OS operating system and commands initiated by the user application flow through XCF 215. In an exemplary implementation, as described further in the discussion below, group members on the same system can send signals to each other through services provided by the XCF 215. There is a buffer pool used for "local signals" that are sent and received by the same system. The stalled member could consume those buffers, preventing other members from being able to send signals that need those buffers, thus causing sympathy sickness within the one system. As discussed further below, a policy rule is defined to terminate the stalled member to alleviate the sympathy sickness.

In one implementation, two instances of coupling facility structure 115, 125 are maintained in separate coupling facilities, referred to as primary coupling facility 110 and secondary coupling facility 120. A CF-to-CF connection 130 (e.g., a peer connection), such as an intersystem Channel (ISC) link, couples coupling facilities 110, 120. Peer ISC link 130 can transmit both primary message commands and secondary message commands in either direction. This transmission may be physically represented by either two unidirectional links, one with a sender channel on primary coupling facility 110 and a receiver channel on secondary coupling facility 120, generally with the second link oppositely configured. This transmission can also be represented by a single physical link where the channel interface in each coupling facility supports both sender and receiver functionality. This latter capability exists in ISC3 links and their variants: ICB3 and IC3. It is appreciated that other peer links such as ICB4 and similar links are also contemplated.

Peer ISC link 130 between coupling facilities 110, 120 is used, for instance, to exchange message path commands on the primary message command interface to configure and couple two coupling facilities 110, 120. Once configured and coupled, peer ISC link 130 can also be used to send secondary commands of the list-notification type to exchange signals as part of a signaling protocol for command execution such as, but not limited to, duplexed command execution. The sending and receiving of these secondary commands is managed by a coupling facility component called signaling protocol engines 150. Requests by cache and list components 160 of respective coupling facility 110, 120 for sending and receiving signals flow through signaling protocol engines 150. Links 131 are used by XCF to exchange commands and data between the x/OS image and the CF. Links 131 between system 200 and the respective coupling facilities 110, 120 are used, for instance, to exchange message path commands to configure structures in a coupling facility and to create, modify, or delete the data contained in such structures. Communication, that is, the passing of messages and signals between instances of an application 210, occurs via XCF 215, as discussed further below with respect to FIG. 2. In general, XCF 215 supplies basic Sysplex® services such as communication between members, and can manage coupling facilities 110, 120 and coupling facility structures 115, 125.

Figure 2:
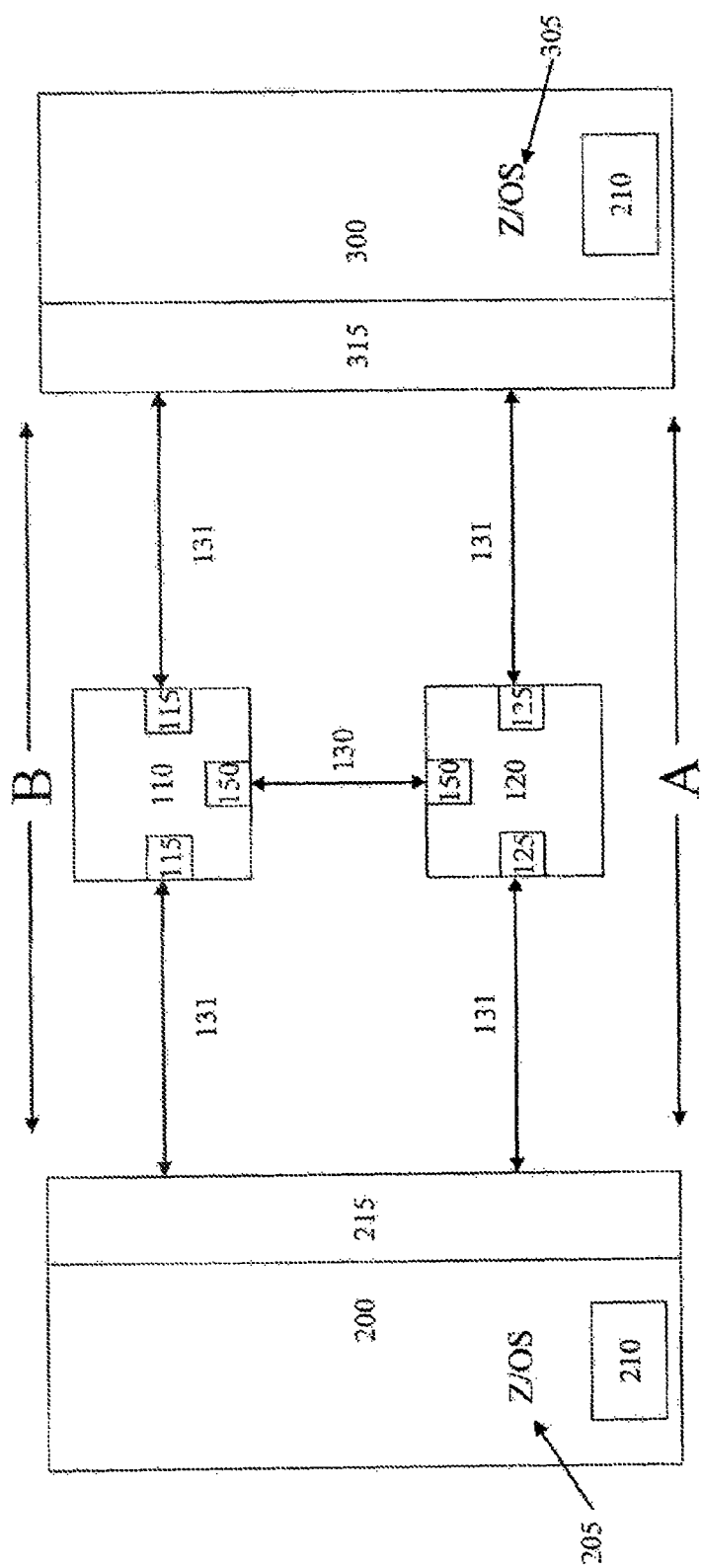
FIG. 2 illustrates an embodiment of a parallel multi-system configuration having two multiple virtual storage (MVS) images and two coupling facilities.

FIG. 2 illustrates an embodiment of a parallel Sysplex® configuration 400 having two multiple virtual storage (MVS) images running the z/OS operating system 205, 305 and two coupling facilities. It is appreciated that configuration 100 and parallel Sysplex® configuration 400 are illustrated for exemplary purposes only it is appreciated that the systems and methods described herein can be advantageously implemented to any type of multi-system configuration. Configuration 400 generally includes system 200, as described above, and system 300, which is similar to system 200. As mentioned above, systems 200, 300 can be two MVS images having a respective XCF 215, 315. It is appreciated that coupling facilities 110, 120 as logical partitions, provide storage for data exchange between components of applications 210, 310 distributed across the different systems 200, 300 in parallel configuration 400. In general, coupling facility structures 115, 125 are allocated for components of applications 210, 310, which are generally represented as different members of configuration 400. As discussed above, XCF signaling is implemented to communicate among the various members of configuration 400. XCF itself can allocate a structure 115, 125 to create a "list signaling path" to provide such communication. In other embodiments, XCF can allocate a channel-to-channel (CTC) device to create a "CTC signaling path" to provide such communication. In other embodiments, combinations of both CTC signaling paths and list signaling paths can be used.

Detecting Sympathy Sickness

In general, if a stall condition is preventing a target system, say from system 200 to system 300, from being able to receive signals, it is generally desirable for the sending system to send a control signal to indicate that it is suffering sympathy sickness. Because the target system is unable to receive signals, some mechanism must be provided to enable such a control signal to be received. In some multisystem configurations, the mechanism for exchanging control signals is independent of the mechanism for exchanging application signals. In the exemplary embodiment, control signals and application signals share the same communication paths. Thus the existing XCF path restart protocol is exploited to enable transfer of the control signal. This protocol exchanges control signals using resources that are not consumed by the stalled members. If there is but one signaling path between the two systems, say via coupling facility 110, two trips through the path restart protocol for the two systems to declare sympathy sickness is generally required. For example, suppose target system 300 has a stalled member consuming signal resources that prevent new signals from being received. As part of the path restart protocol, the sending system 200 sends a control signal CS1 to request that a connection be established with the target system 300. Target system 300 replies with a control signal CS2 indicating that there are stalled members preventing signals from being received. When the signaling path is next restarted, sending system 200 includes an indication in the CS1 signal as to whether it is suffering from sympathy sickness (that is, it has a signal that could not be sent because the stalled members on target system 300 are consuming the signal resources needed to receive new signals). When target system 300 receives this CS1 signal with this indication, it confirms that it still has stalled members preventing signals from being received. If so, target system 300 declares that sympathy sickness exists. The CS2 signal sent in reply to the CS1 signal includes an indication to this effect. When the CS2 signal with this indication is received, sending system 200 that is being impacted also declares that sympathy sickness exists.

In exemplary embodiments, the aforementioned control signals contain the following data: three one bit flags; SS_NoBuffer, SS_Impact, SS_StalledMembers. The bit is either 1 or 0 according to whether there is or is not a "no buffer" condition (discussed further in the description below), a sympathy sickness impact, or stalled members, respectively. As discussed, the system that has the stalled member that is causing sympathy sickness is the "culprit system" and the system being impacted the "impacted system". The control signal CS2 sent by the culprit system sets SS_NoBuffer if the signaling path is suffering no buffer conditions, and sets SS_StalledMembers if it has stalled members consuming inbound path signal buffers. The control signal CS1 sent by the impacted system sets SS_Impact if it is suffering sympathy sickness. The culprit system sets SS_Impact in the CS2 signal if the CS1 signal had its SS_Impact flag set and if the culprit system still has "no buffer" conditions and stalled members. The impacted system sets SS_Impact to indicate, "I think you are causing me to suffer sympathy sickness" and the culprit system sets SS_Impact to indicate, "Yes, your accusation is true".

Furthermore, the control signals also include 1 byte transport class index to associate the signaling path with a particular transport class. The sending/impacted system manages the transport classes and determines the class to which a path is assigned. Each such transport class is assigned a transport class index. That index is included in CS1. The control signals also include "action information" to describe what action, if any, it intends to take to resolve sympathy sickness, a timestamp indicating when such action is to be taken (WhenToAct), and a timestamp indicating when it was decided to take the indicated action (WhenDecided). This last timestamp is used to determine which signal has the most recent action information. The "action" can be one of: none, manual, now, later, or ignore. For "none" and "manual", no automatic action to alleviate sympathy sickness is being taken by the system. None implies that there is no SFM policy, and manual implies that the SFM policy exists but does not give permission for automatic action. "Now" and "later" imply that the SFM policy permits automatic action to terminate stalled members causing sympathy sickness, in which case WhenToAct indicates when that action is to be taken. "Ignore" means that the SFM policy permits automatic action, but that specification is being ignored because either the culprit system or the impacted system (or both) is being removed from the Sysplex®. The action information can be included in other signals exchanged by systems in the Sysplex® that allow XCF to perform its basic functions.

XCF supports multiple signaling paths between systems, such as systems 200, 300. Therefore, there is a net effect that given a set of signaling paths, sending system 200 is able to continue sending signals so long as there is one signaling path capable of transferring a signal. Thus sympathy sickness typically does not occur until the stalled members on target system 300 are consuming inbound signaling resources to the extent that new signals cannot be received over any signaling path in the set. In such a scenario, as each signaling path goes through the path restart protocol, each CS2 signal indicates that stalled members are consuming signal buffers so that this path cannot receive new signals. Eventually one of the paths in the set is restarted and the CS1 signal indicates that sending system 200 is suffering a sympathy sickness impact. When target system 300 receives this CS1 signal, it inspects all the inbound paths in the set. If it is still true that all of them are impacted by stalled members, target system 300 declares sympathy sickness, and so indicates the presence of sympathy sickness in the CS2 reply signal. When the CS2 signal is received, sending system 200 also declares that sympathy sickness exists.

Furthermore, since XCF supports the notion of transport classes, which allows the customer to segregate signaling resources according to various criteria, there may be a set of paths in a first class A, and a set of paths in a second class, B. For exemplary purposes, it is sufficient to consider a simple case in which any particular signal is sent using the resources of only one class, say A. Thus, it is possible that signals being sent via the signaling paths assigned to class A are transferred successfully, but stalled members on target system 300 could be consuming inbound signal buffers so that no new signals can be received over the paths in class B. For example, the paths in class A are used for sending messages up to 1 KB in length and the paths in class B are used for sending messages greater than 1 KB. Therefore, signals sent to the stalled members on target system 300 can all be greater than 1 KB, in which case signals for class B could be suffering from sympathy sickness but signals for class A are delivered successfully. Thus, sympathy sickness monitoring and detection is performed for each transport class. The paths assigned to each class form a "set of signaling paths" to which the aforementioned sympathy sickness detection methodology paragraph can be applied.

Signaling sympathy sickness exists when sending system 200 is unable to transfer a signal via set of signaling paths to target system 300 due to stalled members. If a signal can be transferred via a path from a set of signaling paths, then the condition is considered to nave been relieved. In general, in one implementation, both sending system 200 and target system 300 monitor the signaling paths in such a set for activity. If any one path successfully transfers a signal, the sympathy sickness condition no longer exists. In general, the two systems 200, 300 do not exchange this information because both sides can use existing XCF path monitoring to detect the transfer. Therefore, sending and target systems 200, 300 can independently conclude that there is no more sympathy sickness without any verification from the other system. In other embodiments, signals might be exchanged to indicate that the sympathy sickness condition has been alleviated. However, it is desirable for target system 300 to understand which paths belong to the impacted set of signaling paths. Thus, independently of any sympathy sickness condition, the CS1 signal includes transport class information so that target system 300 can associate each inbound path with the same set of paths being used by sending system 200 for a particular transport class. This transport class information can be included in other signals exchanged by systems in the Sysplex® that allow XCF to perform its basic functions.

Sending Signals Over Paths When Target System Has "No Buffer" Condition

Figure 3:
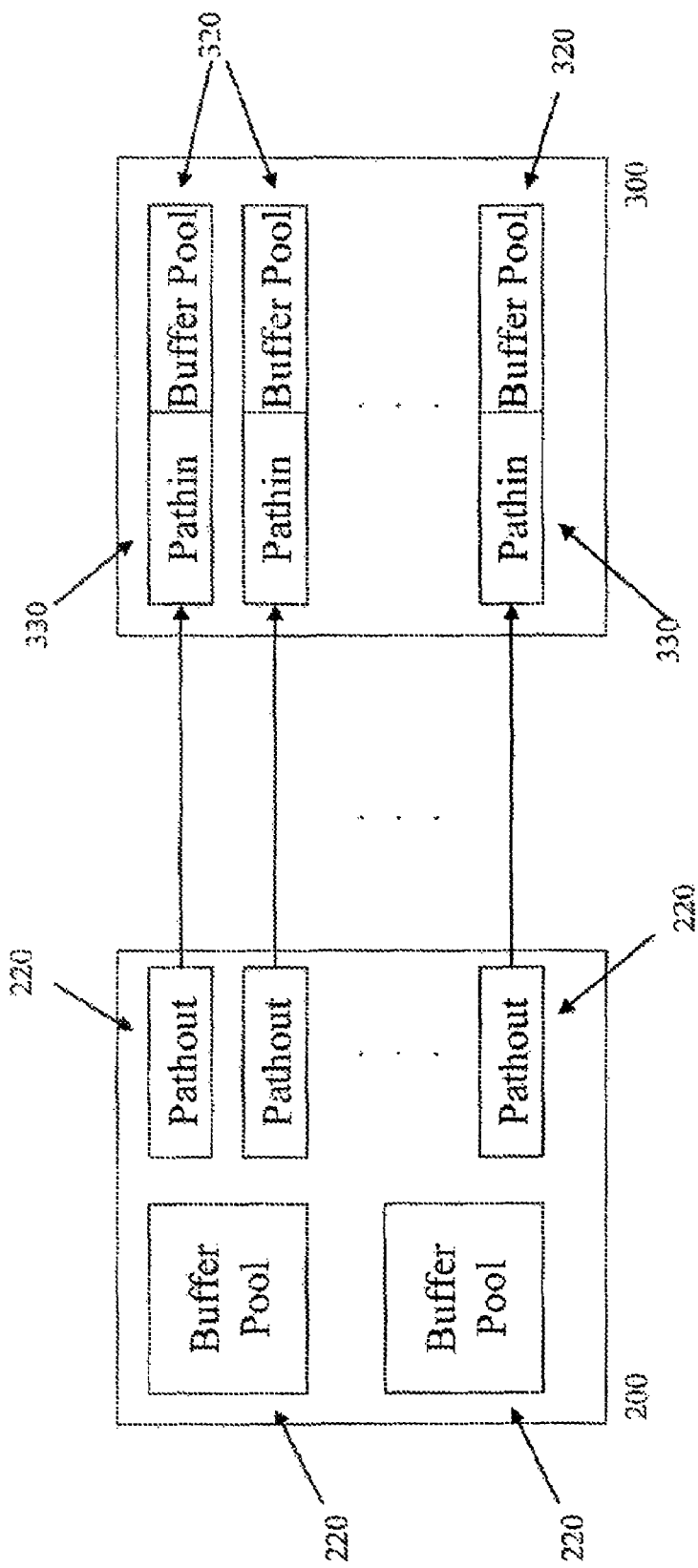
FIG. 3 illustrates an embodiment of a multi-system configuration illustrating sending system and target system.

Prior to a member of target system 300 being declared stalled, target system 300 is likely experiencing "no buffer" conditions that prevent it from being able to receive signals. FIG. 3 illustrates an embodiment of a multi-system configuration illustrating sending system 200 and target system 300. As discussed above, when XCF signals (messages) are generated, they are assigned to a transport class based on, among criteria, group name, message size and the like. The signals, in this ease on sending system 200, are copied into a signal buffer from XCF buffer pool 220. The signals are sent over outbound paths (PATHOUT) 230, defined for the appropriate transport class. On target system 300, inbound paths (PATHIN) 330 receive the signals. Inbound paths 330 are often not directly assigned transport classes. However, a corresponding buffer pool 320 can be allocated and associated with inbound paths 330. In general, XCF on sending system 200 can be unaware of this "no buffer" condition, and can continue to queue signals for transfer over an assigned path since it appeared to have a working connection. However, in a typical implementation, the CS2 reply signal, as discussed above, can also include an indication that target system 300 may not be able to receive signals due to "no buffer" conditions. When sending system 200 processes the CS2 reply signal, it further establishes the connection, but marks the path as "not viable". Sending system 200 subsequently avoids using the path for signals until the path is able to prove itself capable of transferring signals. In a typical implementation, to make this determination, sending system 200 queues up internal XCF control signals for transfer over the path. Typically, so long as target system 300 continues to have "no buffers", the control signals remain pending. If the "no buffer" condition is resolved, the signals are subsequently transferred. The existing path monitor on sending system 200 is updated to recognize when these "prove viability" signals have been received by target system 300. At that point, sending system 200 deems the path to be "viable" and allows it to be used for normal signal traffic.

Since XCF supports different buffer sizes, sending system 200 can set up viability signals in a series of steps. For example, target system 300 might have 2 KB of space available, enough to receive small messages, but not enough to receive larger messages. Therefore, the viability protocol first has target system 300 set up to receive the largest possible signal that was ever sent over the path up to the point that the viability protocol is initiated. Therefore, viability signals, when successfully transferred, "land" in large buffers. If those the viability signals are transferred successfully, XCF can be sure that target system 300 appears to have enough buffer space to receive the largest signals seen by the path up to that point.

Documenting the Sympathy Sickness Condition

When sympathy sickness is detected or is relieved, both sending system 200 and target system 300 issue a message to so indicate the sympathy sickness status. These messages provide alerts so that system automation or operators can investigate the problem and take appropriate action. Each message indicates which system is the culprit and which system is the victim of the sympathy sickness. This message protocol is advantageous because it (1) indicates that there is a sympathy sickness problem, (2) identifies which system is causing the problem, and (3) provides support on both sending system 200 and target system 300 to indicate that there is a sympathy sickness problem.

In order to investigate the problem, data about the stalled member(s) can be gathered. In a one implementation, the existing IXCMG interface, which permits data to be gathered from other members in the multi-system configuration, can be utilized to implement signals to exchange the data. It is appreciated that with the presence of sympathy sickness, it may not be possible to send a signal to target system 300 that has the stalled members so that data can be collected. To mitigate this problem, target system 300 periodically broadcasts information about stalled members to the rest of the multi-system configuration. Thus, it may not be necessary to wait for a response to a specific query because the needed data was already voluntarily sent by the culprit system, it is further appreciated that this type of monitoring that takes advantage of the existing interface works when the sympathy sickness impact is only in one direction.

In exemplary implementations, the IXCMG interface allows a program to obtain data from XCF. The user can invoke the IXCMG macro, specifying keywords to describe what data is to be collected and returned. First, a keyword (GATHERFROM) is used to allow the invoker to indicate which system is to gather the data. GATHERFROM=LOCAL behaves as in the past, causing data to be collected from the system on which the request was issued. GATHERFROM=OTHER allows the invoker to indicate which system in the Sysplex® is to perform the data gathering. XCF sends a signal containing the request to the indicated system, performs the data collection on that system, then sends the results back to the invoker's system. The data collection is performed asynchronously to the invoker request. Upon return from the GATHERFROM=OTHER invocation, XCF provides a token that can be used to retrieve the results. The user then invokes IXCMG interface with GATHERFROM=TOKEN to retrieve the data that was asynchronously collected and sent by the other system in response to the GATHERFROM=OTHER request. Second, the data collected by the interface includes information related to sympathy sickness and the state of the related signaling paths and group members. Third, the data collected by the interlace includes information to enable the GATHERFROM=OTHER and GATHERFROM=TOKEN invoker to be able to determine information about the results of the request. For example, levels of data provided and levels of data that could be provided are included. As such, an operator can issue commands that use this interface to gather data and then display such data to allow the operator to see what is occurring in the multi-system configuration.

The IXCMG interface further allows the exploiter of the interface to specify which system in the multi-system configuration is to perform the data gathering, which can include the data about stalled members as discussed above. In the exemplary configuration implementing z/OS, it is appreciated that the various systems in the multi-system configuration, such as sending system 200 and target system 300, could be running at different releases of z/OS and would therefore support different versions of the IXCMG interface. In a one implementation, configuration 100 includes a protocol that allows a down-level system to be able to forward an up-level IXCMG request to an up-level system for processing, and have the results returned to the down-level system for presentation to the requester. This protocol is accomplished as follows: as each system in multi-system configuration 100 performs and initial program load (IPL) and becomes an active participant in the multi-system configuration, it indicates to the other systems in the configuration the latest version of the IXCMG parameter list that is supported and the lengths of each associated parameter list version. If a down-level system is presented with an up-level parameter list, it can use this information to copy and send the full-length parameter list to the up-level system that understands it. As such, all systems in the multi-system configuration can send and receive data related to sympathy sickness conditions and therefore be able to document the condition.

Remedies For Sympathy Sickness

As mentioned above, the Sysplex® Failure Management (SFM) policy allows the installation to specify failure detection intervals and recovery actions to be initiated in the event of the failure of a system in the multi-system configuration. SFM allows the installation to code a policy to define the recovery actions to be initiated when specific types of problems are detected, such as fencing off the failed image which prevents it access to shared resources, logical partition deactivation, or central storage and expanded storage acquisition, to be automatically initiated following detection of a parallel Sysplex® failure. In general, it is appreciated and well known that SFM prevents time delays that are typical in operator intervention that might tie up critical system resources required by the remaining active systems.

A new keyword is added to the existing SFM policy to allow the customer to indicate whether XCF is to take automatic action to relieve the sympathy sickness condition in the configuration 100. If the policy indicates that XCF should take automatic action, XCF terminates the stalled member. Terminating the member allows XCF to reclaim the resources that were being consumed by the stalled member. Thus, signals are able to flow over the signaling paths once again. Therefore, the SFM policy not only takes automatic action to terminate a system that does not appear to be responsive, but also allows automatic termination of stalled members that are causing sympathy sickness.

It is appreciated that it is the responsibility of the system on which the stalled member resides to terminate the member, such as target system 300. If there are two systems with stalled members causing an impact, it could be that both systems might decide to take action at the same time. But it is also possible that termination of one member would also relieve the stall condition on the other system. Therefore, in a one implementation, it is desirable for the involved systems to take turns in terminating the stalled member.

Thus, the termination action taken by one system might allow the stalled member on the other system to survive. To coordinate termination actions, the systems that intend to take action indicate via the CS1 and CS2 signals exchanged during path restart, the time at which they intend to act. When a system with stalled members detects that it is causing sympathy sickness, it examines the "take action" times it has received. The system then picks an action time that does not coincide with an action time that has already been chosen by another involved system. It is appreciated that such action information can be exchanged via signals other than CS1 and CS2. In other embodiments, such information could be communicated via other mechanisms such as shared Direct Access Storage Devices (DASD) or data in a coupling facility.

In another implementation, when the SFM policy specifies that XCF is permitted to take automatic action to attempt to alleviate signaling sympathy sickness, the policy can further query whether or not the stalled member has already been removed from the configuration 100. Thus, to avoid repetitively attempting to terminate the stalled member(s) responsible for the problem, the policy first queries whether or not the stalled members have already or are in the process of being removed.

It is appreciated that until the stalled member is terminated, the overall configuration can continue to suffer signaling sympathy sickness. If the SFM policy permits XCF to take action to alleviate such sympathy sickness automatically, it may determine that the culprit system, not just the culprit member, should be terminated. However, if me impacted system is itself already in the midst of being removed from the multi-system configuration, XCF retrains from terminating the culprit system. By having XCF refrain from automatically terminating culprit system with the stalled member in such a situation where the impacted member's system is already being terminated, the policy prevents both systems from being unnecessarily terminated, which could otherwise in the worst case, cause the entire multi-system configuration to be terminated.

Therefore, in a one implementation, XCF refrains from taking action to alleviate signal sympathy sickness if the impacted system(s) are already being removed from the multi-system configuration. However, it is also appreciated that another system that is not being terminated may still be suffering sympathy sickness caused by the culprit system. In such a case, XCF can take action to automatically terminate the culprit member to alleviate the sympathy sickness. Since there can be a delay between the time when a system starts to be partitioned from the multi-system configuration and the time when the surviving systems detect that target system 300 is being removed, each system in the multi-system configuration can send respective CS1 and CS2 signals, or other signals, to inform the other systems when it intends to take action to relieve sympathy sickness. If a system decides that it needs to take action to alleviate signaling sympathy sickness, it uses this information received via such CS1 and CS2 or other signals to attempt to avoid taking action at the same time as any other system. Further, the policy allows a time interval for the acting system to take its action so that an action of "remove self from Sysplex®" has a chance of being detected by the surviving systems. Also, when a system first decides to take action, or when a system decides to change the time when it intends to take action, the policy delays taking that action until it has had a chance to share its intended action information with the other systems in the multi-system configuration.

Figure 4:
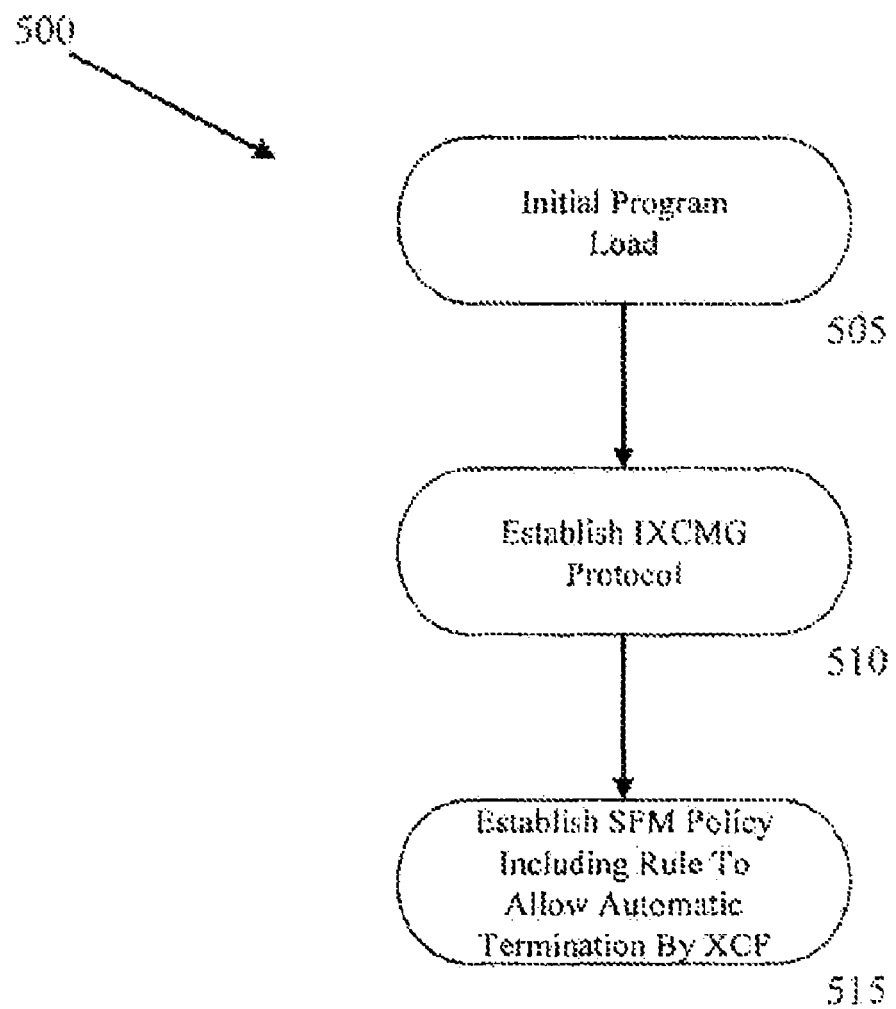
FIG. 4 illustrates a flowchart of an embodiment of a multi-system configuration installation method.

FIG. 4 illustrates a flowchart of an embodiment of a multi-system configuration installation method 500. The flowchart illustrates a simple installation of the policy-driven method present on a multi-system configuration as described herein. In general, upon an initial program load 505, the IXCMG protocol can be established 510 and the SFM policy allowing automatic termination of a stalled member can be established 520. Once such an installation in a multi-system configuration occurs, then sympathy sickness can generally be detected and resolved as described herein and as shown in a flowchart below.

Figure 5:
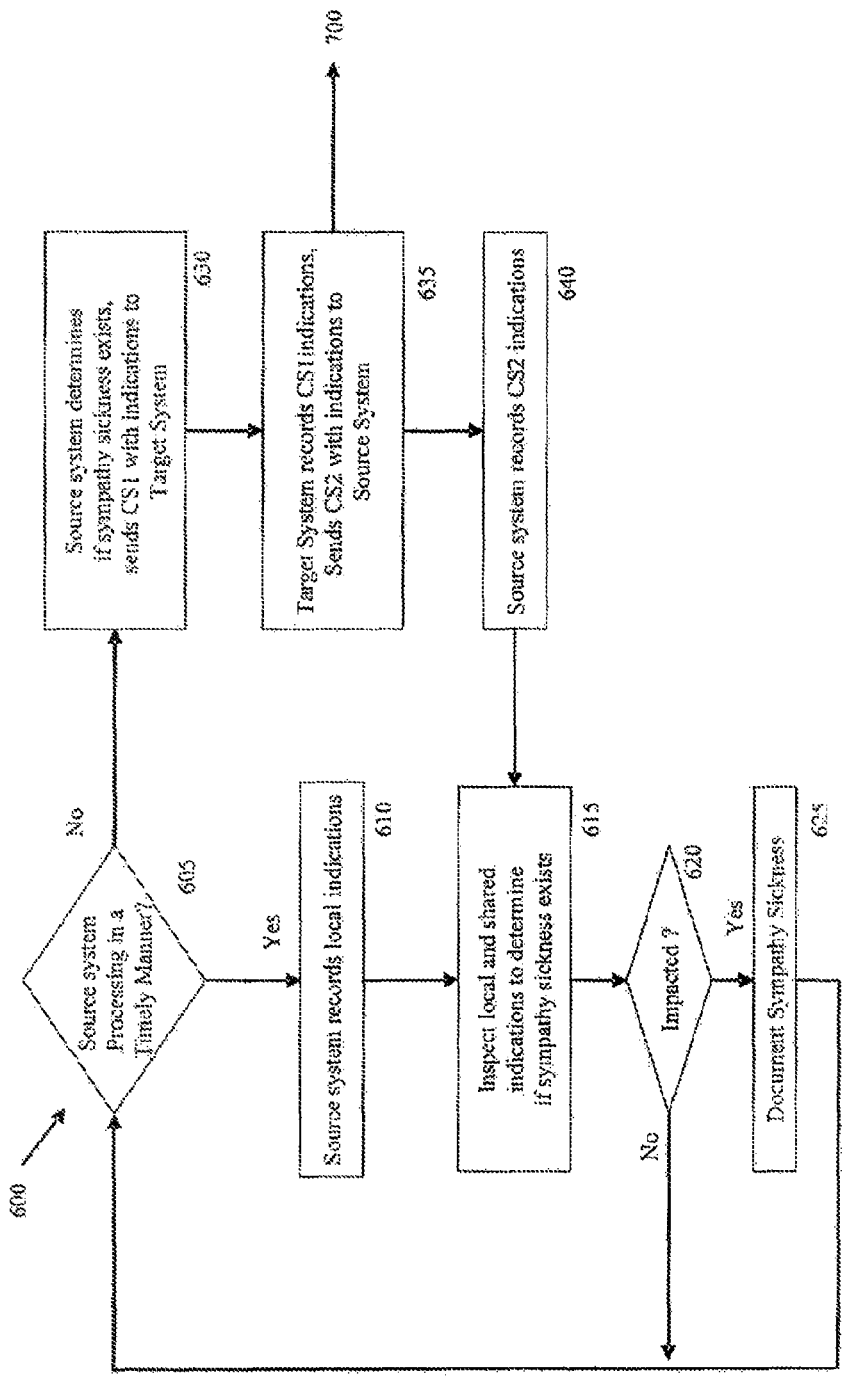
FIG. 5 and FIG. 6 illustrate a flowchart of an embodiment of a policy directed detection and resolution method.
Figure 6:
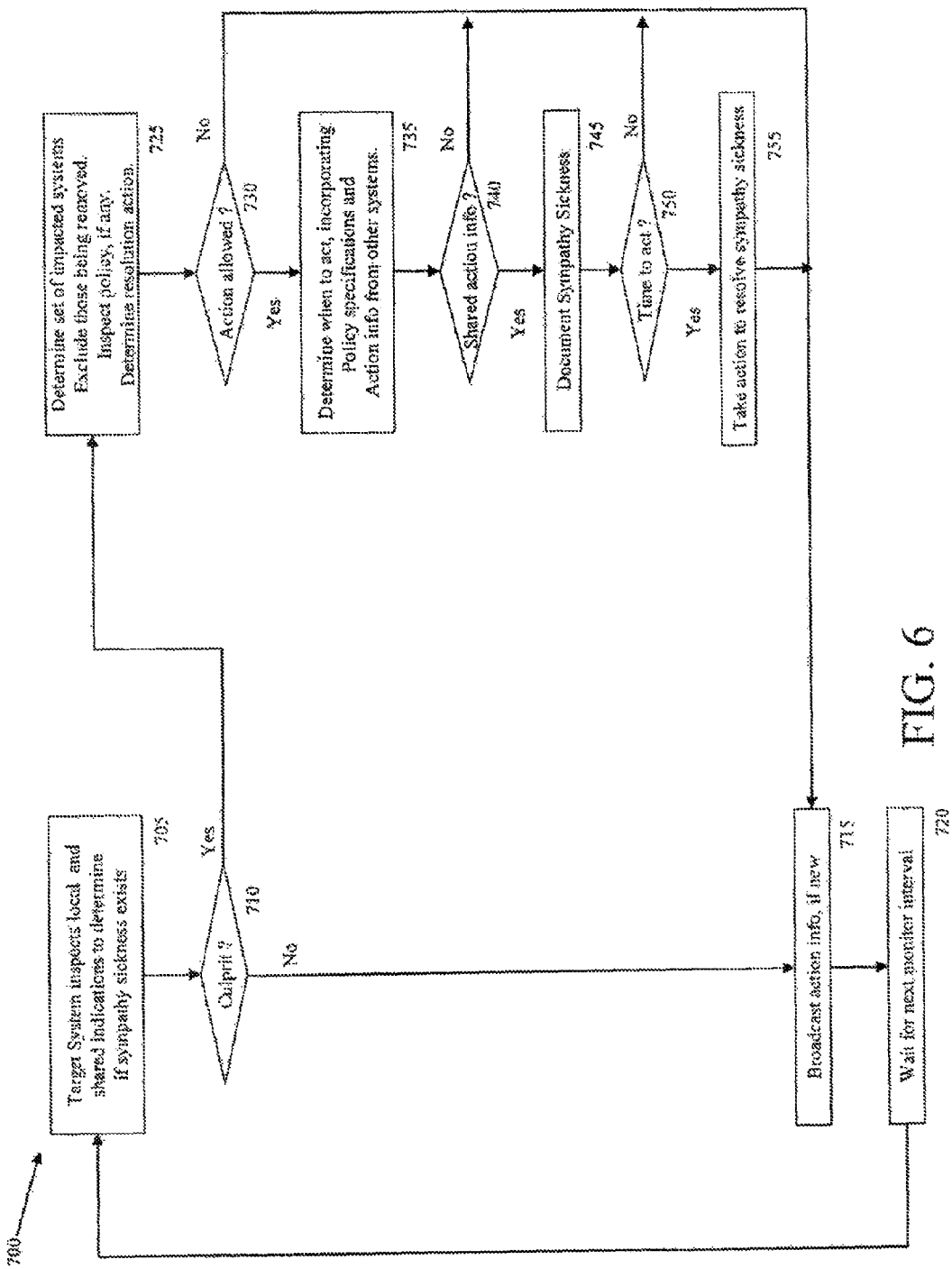

FIG. 5 illustrates a flowchart of an embodiment of sympathy sickness detection method 600 and FIG. 6 illustrates a flowchart of an embodiment of policy directed resolution method 700. In general, once an installation is performed as discussed immediately above, a multi-system configuration, such as the Sysplex® embodiments described herein, can function as normal. If the multi-system configuration experiences some sort of performance issues such as but not limited to: hangs where work performed on the systems do not make progress; work queues becoming longer and longer; processes terminating due to timeouts; and the like, then method 600 can generally perform. One or more particular sending systems can determine if it is performing in a timely manner 605. If so, then it can record local indications to so indicate 610. If not, then as described above, the sending system can send a CS1 signal to a target system 630. If the target system is indeed causing sympathy sickness, such as by, but not limited to, a stalled member or a "no buffer condition, at 635, then the target system can send a CS2 signal, with an indication of among other things, the fact that the system is causing a sympathy sickness related problem and the type of condition. The sending system can receive this signal, and record the indications shared by the target system 640. It is appreciated that in a one implementation, as discussed above, a modified XCF path restart protocol is used to take advantage of the control signals with the added advantage of specified indication. The sending system can then inspect the local and shared indications 615 to determine whether a sympathy sickness condition exists, and if so, whether the target system is contributing to such a condition. If so, at 620, the sending system can determine whether to document the problem 625. Such documentation can include the issuing of operator messages. Information presented to the operator could be gathered via the IXCMG interface, as discussed above. The indicators recorded by the target system at 635 are used by the policy directed resolution method 700, and in particular, at 705 where it inspects both local and shared indicators to determine whether it is causing sympathy sickness on the source system. If the target system determines that it is causing such sympathy sickness 710, it then determines the set of all such target systems that are being impacted by such sympathy sickness 725, but excludes any such target system that is being or has been removed front the configuration. The XCF is already capable of determining when a system is being removed from the configuration and such determinations are now inspected by the SFM Policy. If there is no SFM policy, or if the SFM policy does not permit XCF to take automatic action to alleviate sympathy sickness, no action is permitted. If action is permitted 730, XCF determines when such action is to be taken 735. The time to act is determined from the SFM policy specification, and as described above, incorporates action information from other systems that describes whether and when those systems themselves intend to take action to alleviate sympathy sickness. If the target system has not shared its own action information with the other systems in the configuration 740, it delays such action, as needed to allow its action information to be sent to the other systems in the configuration 715, thereby providing the potential for each system in the configuration to take into account the action information of its peer systems. If the current action information has been sent to the other systems, the target system can then document that it is causing sympathy sickness 745. Such documentation could include operator messages, the recording or gathering of data to assist in the diagnosis of the problem, or the sending of data suitable for gathering by the IXCMG interface on other systems, as described above. The target system then determines whether the delay period specified in the SFM Policy has expired 750. If so, it takes action to alleviate the sympathy sickness condition 755.

In general, all sympathy sickness data can advantageously be processed through IXCMG interfaces, in which all versions of differing parameter lists have been processed upon IPL. After all data has been processed and sympathy sickness declared, the policy driven rule allows XCF to automatically terminate the stalled member. However, SFM generally queues whether or not another member during routine monitoring has already begun termination of the stalled member. If not, then XCF automatically terminates the stalled member 755. Upon termination of the stalled member, the control signals are still used in the modified path restart protocol to determine whether or not the signal path, once not viable due to sympathy sickness, is now viable 635 and 640. In general, a control signal from target system such as CS2, is continuously generated through out the process, but with an indication that the signal path is now once again viable and can resume normal traffic. Once signal paths are cleared and are viable, the multi-system configuration can commence normal operation and can start the process again at 605 and 705, if necessary. As described above, viability of the signal paths can also be determined by observing successful transfer of the viability signals.

It is appreciated that the systems and methods described herein allow modification to existing SFM policies and existing XCF and IXCMG interfaces and protocols to not only detect but also resolve signaling sympathy sickness with automatic rules that remove the need for time-delaying operator intervention.

It is further appreciated that although a multi-system configuration such as an IBM Sysplex® system implementing XCF signaling has been discussed as an exemplary system implementing the embodiments of the systems and methods described above, any cluster or distributed system environment where distinct processors that can cause sympathy sickness with each other is contemplated to further implement the systems and methods described herein. The embodiments of the systems and methods can further be applied to any multi-tasking environment where the processing of work is mutually dependent on distinct tasks or processes making progress.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. In a multi-system configuration having a communication among a plurality of members, each member having a cross-system coupling facility (XCF), which manages communications between the plurality of members, a method of managing sympathy sickness, the method comprising:
   detecting a sympathy sickness condition affecting at least one member of the plurality of members, by generating a first control signal that includes an indication that there is a sympathy sickness condition in the multi-system configuration, and by receiving a second control signal that includes an indication that the plurality of members includes at least one stalled member and a no buffer condition;
   documenting said sympathy sickness condition; and
   implementing a policy rule to resolve said sympathy sickness condition.

2. The method as claimed in claim 1, wherein detecting a sympathy sickness condition comprises:
   generating a first control signal from a sending system of said plurality of members;
   receiving said first control signal in a target system; and
   generating a second control signal from said target system to said sending system.

3. The method as claimed in claim 2 further comprising providing an indication in said second control signal that there are stalled members preventing signals from being received in said target system.

4. The method as claimed in claim 3 further comprising resending said first control signal having an indication that said sending system is experiencing said sympathy sickness condition.

5. The method as claimed in claim 4 further comprising:
   declaring a sympathy sickness condition from said sending system; and
   declaring a sympathy sickness condition from said target system in response to said target system receiving said first control signal having said indication that said sending system is experiencing said sympathy sickness condition.

6. The method as claimed in claim 2 further comprising implementing an (XCF) path restart protocol if said sending system is suffering from said sympathy sickness condition.

7. The method as claimed in claim 1 wherein documenting said sympathy sickness condition comprises gathering data via an interface disposed on each of the plurality of members.

8. The method as claimed in claim 1 wherein implementing a policy rule to resolve said sympathy sickness condition comprises allowing one or more of said (XCF) to automatically terminate a stalled member of the multi-system configuration.

9. The method as claimed in claim 8 further comprising determining whether said stalled member is already in the process of being terminated prior to said (XCF) terminating said stalled member.

10. In a multi-system configuration having a communication among a plurality of members, each member having a cross-system coupling facility (XCF), which manages communications between the plurality of members, a method of managing sympathy sickness, the method comprising:
  detecting a sympathy sickness condition affecting at least one member of the plurality of members, including:
    generating a first control signal from a sending system of said plurality of members;
    receiving said first control signal in a target system;
    determining a no buffer condition on said target system;
    generating a second control signal from said target system to said sending system, said second control signal including an indication that a no buffer condition exists on said target system;
  documenting said sympathy sickness condition; and
  implementing a policy rule to resolve said sympathy sickness condition.

11. The method as claimed in claim 10 further comprising establishing that a signal path defined between said sending system and said target system and associated with the no buffer condition, is not viable.

12. The method as claimed in claim 11 further comprising:
  establishing prove viability signals between said sending system and said target system;
  generating prove viability signals from said sending system to said target system;
  monitoring whether or not prove viability signals have been received on said target system: and
  resuming normal signal traffic on said signal path in response to said target system including an indication in said second signal that said signal path is deemed viable.

13. The method as claimed in claim 10 further comprising providing an indication in said second control signal that there are stalled members preventing signals from being received in said target system.

14. The method as claimed in claim 10 further comprising implementing an (XCF) path restart protocol if said sending system is suffering from said sympathy sickness condition.

15. The method as claimed in claim 14 further comprising:
  resending said first control signal having an indication that said sending system is experiencing said sympathy sickness condition;
  declaring a sympathy sickness condition from said sending system; and
  declaring a sympathy sickness condition from said target system in response to said target system receiving said first control signal having said indication that said sending system is experiencing said sympathy sickness condition.

16. The method as claimed in claim 10 wherein documenting said sympathy sickness condition comprises gathering data via an interface disposed on each of the plurality of members.

17. The method as claimed in claim 10 wherein implementing a policy rule to resolve said sympathy sickness condition comprises:
  allowing one or more of said (XCF) to automatically terminate a stalled member of the multi-system configuration; and
  determining whether said stalled member is already in the process of being terminated prior to said (XCF) terminating said stalled member.

18. A system for detection and resolution of signaling sympathy sickness, the system comprising:
  a sending system;
  a target system;
  a coupling facility disposed between the sending system and the target system;
  at least one signal path defined between said sending system and said target system via said coupling facility;
  a plurality of members distributed over a multi-system configuration;
  a cross-system coupling facility (XCF) disposed on each of and manages communications between said plurality of members;
  a policy-directed process residing on at least one of the plurality of members, the process having instructions to allow said (XCF) to automatically terminate members of the system that declared sympathy sickness; and
  (XCF) signals transmitted on said signal path, said (XCF) signals including:
    a first control signal generated by said sending system and including an indication that it is suffering from sympathy sickness; and
    a second control signal generated by said target system and including an indication that it has at least one of a stalled member and a no buffer condition.

19. The system as claimed in claim 18 wherein the policy-directed process is included in Sysplex® Failure Management (SFM) policy, and wherein said policy-directed process further includes instructions to determine whether or not another of said plurality of members has initiated termination of a stalled member prior to said (XCF) automatically terminating said stalled member.

20. A system for detection and resolution of signaling sympathy sickness, the system comprising:
  a plurality of members distributed over a multi-system configuration;
  a cross-system coupling facility (XCF), which manages communications between the plurality of members, disposed on each of said plurality of members; and
  a policy-directed process included in a Sysplex® Failure Management (SFM) policy and residing on at least one of the plurality of members, the process having instructions to allow said (XCF) to automatically terminate members of the system that declared sympathy sickness,
  wherein said policy-directed process further includes instructions to determine whether or not another of said plurality of members has initiated termination of a stalled member prior to said (XCF) automatically terminating said stalled member.

21. The system as claimed in claim 20 further comprising a coupling facility disposed between a sending system and a target system.

22. The system as claimed in claim 21 further comprising at least one signal path defined between said sending system and said target system via said coupling facility.

23. The system as claimed in claim 22 further comprising (XCF) signals transmitted on said signal path, said SCF signals including:

a first control signal generated by said sending system and including an indication that it is suffering from sympathy sickness; and a second control signal generated by said target system and including an indication that it has at least one of a stalled member and a no buffer condition.

* * * * *